UNITED STATES PATENT OFFICE 2,661,305

METHOD FOR IMPROVING THE BRIGHTNESS OF TEXTILE MATERIALS AND PRODUCT

Henry B. Appleton and Peter F. Kiehl, Deighton, Huddersfield, England, assignors to L. B. Holliday & Company, Limited, Deighton, Huddersfield, England No Drawing. Application November 1, 1949, Serial No. 124,946

12 Claims. (Cl. 117—33.5)

It is well known that certain compounds such, for instance, as products of the coumarin group, particularly B-methyl umbelliforone, substituted diamino-stilbene disulphonic acid derivatives and condensation products based on cyanuric halides, have the property, when applied to white or off-white fabrics, of increasing the whiteness to an extent unobtainable by normal methods of bleaching or treatment with blueing agents such as ultramarine or suitable dyestuffs, and when applied to dyed fabrics have the property of imparting a richer and fuller shade and purity of colour.

The effect in both cases results from a property common to these compounds, namely that of fluorescing on exposure to ultra-violet or short wave violet light.

When white or off-white textile fabrics, for instance, are immersed in dilute aqueous solutions of the compounds referred to, the known compounds being all water-soluble, the compound is absorbed on to the fibres with the result that, on drying, the degree of whiteness of the fibres is considerably enhanced, the presence of the compound on the fibres being ascertainable by exposure of the fabric to ultra-violet light when the fibres will be seen to fluoresce with a more or less blue fluorescence, the intensity depending to some extent upon the nature of the compound used and its affinity for the particular fibre. When examined in daylight the fabric, after treatment, presents a considerably whiter appearance than before, this being due to the property it now possesses of converting ultraviolet light in daylight into visible light.

We have discovered that products of another group based on the nuclear structure of substituted di-hydro collidine possess the properties above referred to in a degree surpassing in many cases to a marked extent that possessed by any of the hitherto known products.

These products are typified by the geenral formula based on substituted di-hydro collidine:

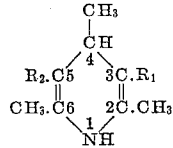

In the general atomic structure indicated above $R_1$ and $R_2$ could be alkyl or alkaryl carboxy acid esters. For example the diethyl ester of di-hydro collidine dicarboxylic acid 2.4.6 trimethyl 1.4 dihydro pyridine dicarboxylic acid diethyl ester (3.5) has been found to possess the properties referred to in marked degree and to be particularly effective, whilst the dibenzyl ester also possesses similar properties.

Other lower carboxy alkyl esters possess similar properties, for example the dimethyl ester is equally effective. It is not essential that $R_1$ and $R_2$ be identical, for example such a product as 2.4.6 trimethyl 1.4 dihydro pyridine dicarboxylic acid 3 methyl 5 ethyl ester has the desired properties.

In the examples given above $R_1$ and $R_2$ are in all cases typified by the grouping —COOR, wherein R is an alkyl or alkaryl group, but the invention is not restricted to this. We have found for example that $R_1$ and $R_2$ may be represented by the —CONHR group, wherein R represents a phenyl or substituted phenyl nucleus, for example —$C_6H_4OCH_3$; —$C_6H_4CH_3$; —$C_6H_4Cl$ or —$C_6H_3Cl_2$, a product being obtained possessing equally effectively the desired properties.

The gamma methyl group may be substituted by another alkyl group, for example by the ethyl group or by an aryl substitution product, the gamma phenyl derivative being an example of such a product.

Other substitution products based on dihydro collidine can be prepared which possess the desired properties in varying degrees.

Dihydro collidine dicarboxylic acid diethyl ester or substitutions thereof as indicated above are insoluble or insufficiently soluble in water for their use in many applications of our invention and it is necessary to prepare them by normal known methods in a suitable dispersed form. This dispersion may be brought about by chemical or physical means, or by normal mechanical reduction, and may include the use of the normal dispersing agents, such as sulphite lye, soap, products of the Nekal type and protective colloids, or the dispersion may be brought about by solution in a suitable solvent and subsequent dissolution in the required dispersed form.

In this dispersed form the compound of the type indicated above or the other substitution products would be a fine suspension in water or alternatively the dispersion can be dried and used in the powder form.

The above prepared products are particularly effective for the whitening of wool yarn and piece goods. They can be used in an acid or neutral bath but the whitening effect is considerably enhanced by the addition to the bath of 0.02 to 0.04% of an acid, which can be formic, acetic or sulphuric acid.

Products according to the invention can be used in conjunction with the normal hydrosulphite reducing bath or as an after treatment. In either case the wool after washing and drying is whitened to a degree surpassing the results obtained without the use of such a product as we have referred to. They can also be used in conjunction with the well-known peroxide bleach, but the most striking effect is obtained by after treatment.

It has further been found that dihydro collidine dicarboxylic acid diethyl ester, as typical of the products we have specified, is particularly effective for application to all other animal fibres for whitening purposes and surpasses normal known bleaching methods.

As materials which can be improved apart from wool, we may mention the following: Pure silk, sheepskins, rabbit fur and combinations of animal fibre mixtures. In addition, these products have affinity for and are effective on cellulose acetate rayon and nylon, and to a lesser extent on cellulosic material. Whilst the products according to the invention have some affinity for all fibres, they are specially suitable for wool and all animal fibres and synthetics. The material to be treated may be in the form of loose materials, yarn and piece goods.

The dispersed preparations can also be used in conjunction with but preferably as an after treatment for pastel shades on wool. Wool previously dyed with Alizarine Brilliant Blue B, and then after-treated with, for example, dispersed dihydrocollidine dicarboxylic acid diethyl ester, has a much purer and brighter tone.

Although it is preferable to prepare the compounds which are the subject of this invention in a dispersed form because they are only very slightly soluble in water, we have found, nevertheless, that at a temperature of 60–70° C., some of these products have appreciable solubility, for example in the case of dihydrocollidine dicarboxylic acid diethyl ester the solubility increases from 0.0008% at 15° C., to approximately 0.01% at 70° C. At this concentration wool and other materials can be effectively whitened by treatment in a bath at 60° C., with the compound referred to above not previously dispersed and acting as a normal water soluble compound.

The following examples illustrate our invention in greater detail, and we have taken therein as our example of a suitable product, the diethyl ester of dihydrocollidine dicarboxylic acid, which will be referred to as "the whitening compound," but the invention is not limited to these examples.

*Example 1*

Bleached wool yarn is treated in a bath with a liquor ratio of, for example, 50:1 at 40° C.–50° C., with 1.0–2.0% of the whitening compound and 1–2% of formic acid for 30 minutes. After this time it is taken out, rinsed thoroughly, and dried. The wool has, after this treatment, an intense white appearance surpassing that obtainable by any normal bleaching method.

*Example 2*

Woollen piece goods can be treated in the same manner as in Example 1 with a considerable improvement in the whiteness of the finished materials.

*Example 3*

Bleached wool yarn and piece goods can be treated in a bath with a liquor ratio of, for example, 50:1 at 40°–50° C., with 1% or less of the whitening compound and 1–2% formic acid. After rinsing and drying the finished material is noticeably whiter.

*Example 4*

Wool yarn or piece goods are treated in a reducing bath containing for example "Hydrosol" or "Blankit I" and subjected to the normal bleaching process at 40° C. The terms "Hydrosol" and "Blankit I" are English and German trade names, respectively, for a textile treating compound based on sodium hydrosulfite with the addition of tetra sodium pyrophosphate anhydrous, which have a well known bleaching action on wool. During the period of the reduction bleach or as an after treatment after rinsing, 2% of the whitening compound on the weight of the material is added together with sufficient formic acid to reduce the pH to the acid side of neutrality, the whole operation being carried out at 40° C. After washing and rinsing, the wool yarn or piece goods will be found to be considerably whiter than by the use of "Hydrosol" or "Blankit I" alone.

The whitening compound is unaffected by the reducing agent used in the bleaching.

*Example 5*

Wool yarn or piece goods are bleached by the normal hydrogen peroxide bleaching process and after subsequent washing are treated with 1.0–2.0% of the whitening compound together with 1.0–2.0% formic acid for 30 minutes at 40° C. After rinsing and drying, a brilliant white is obtained far surpassing that obtained by the peroxide alone. As an alternative process, the whitening compound can be used in the peroxide bleaching bath as it is unaffected by the oxidising agent at the concentration.

*Example 6*

Wool is dyed with, for example, 0.2% pastel shade of Alizarine Brilliant Blue B and after allowing the bath to cool to 40–50° C., it is treated with 1–2% of the whitening compound without further addition of acid and the bath is maintained at 40° C., for 15–30 minutes. After washing and drying it will be seen that the shade is much purer and brighter in tone than it is in the case of dyed material not so treated with the whitening compound.

Alternatively the whitening compound may be added to the dyebath 15 minutes before the end of the dyeing operation or immediately on completion of the dyeing operation, but without cooling. In these instances the effect, although marked, is not so striking as that obtained by the prior method described.

*Example 7*

For the bleaching and whitening of lambskins the following method is adopted.

A dressed skin immersed in a solution of 11 gallons of water with ½ lb. of "Hydrosol" for 5 hours at 40° C. After treatment the skin is rinsed and treated in a 0.05% solution of the whitening compound, with the addition of 1–2% formic acid at 40–50° C., for 30 minutes.

After rinsing, stretching and dyeing, the skin will be seen to be considerably whiter than skin bleached only with "Hydrosol."

*Example 8*

Bleached rabbit skins or fur are treated at 40°

C., in an aqueous bath with 1-2% of the whitening compound for 30 minutes. After rinsing, subsequent treatment and drying the fur is intensely white.

*Example 9*

Wool yarn or piece goods are treated in a bath at 60° C., with 1-2% of the whitening compound, not previously dispersed, or in a prepared form, for 30 minutes, with the addition of 1-2% formic acid. After rinsing and drying, the material will be found to be considerably whiter than before.

*Example 10*

Nylon fibres or piece goods are treated in a bath at 40-50° C., with 1-2% of the whitening compound, with the addition of 1-2% formic acid, for 30 minutes. After rinsing and drying, the nylon will be seen to be considerably whiter than before treatment.

*Example 11*

Nylon piece goods can be treated in a bath at 40° C., with 1% of the whitening compound for 30 minutes. After rinsing, drying and pressing, the finished material will be considerably whiter than before.

*Example 12*

Cellulose acetate rayon is treated in a bath at 40 to 50° C., with the addition of 1-2% of the whitening compound, and 1-2% formic acid. After 30 minutes, the goods are removed, rinsed and dried.

The resulting material is much whiter than before treatment.

*Example 13*

Whitening of cellulose acetate rayon in a neutral bath.

This can be treated exactly as for nylon in Example 11.

The cellulose acetate will be found to be considerably whiter than before.

*Example 14*

Cotton goods are immersed in a bath at 50°-60° C., with 2% of the whitening compound together with 10% of Glauber's salt and maintained for 30 minutes. After rinsing and drying, the cotton material will be seen to be noticeably whiter than before treatment and under the ultra violet lamp shows a blue-white fluorescence.

Having thus described our invention, what we claim as new and desire to secure by Letters Patent is:

1. A method of improving the brightness of textile materials comprising the steps of immersing a textile material in an aqueous agent having distributed therethrough a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

2. A method of improving the brightness of textile material comprising the steps of dispersing in water a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine so as to form an aqueous dispersion thereof; immersing a textile material in said aqueous dispersion of said derivative of dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

3. A method of improving the brightness of textile materials, comprising the steps of immersing a bleached textile material in an aqueous agent having distributed therethrough a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

4. A method of improving the brightness of textile materials, comprising the steps of immersing a dyed textile material in an aqueous agent having distributed therethrough a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

5. A method of improving the brightness of textile materials, comprising the steps of immersing a bleached textile material in an aqueous agent having distributed therethrough dihydrocollidine 3,5 dicarboxylic acid diethyl ester which fluoresces with a blue-white fluorescence under ultra-violet light until said textile material is impregnated with a sufficient amount of said derivative of dihydrocollidine to render said textile material whiter after rinsing and drying; and rinsing and drying said textile materal being impregnated with said derivative of dihydrocollidine so as to obtain a substantially dry textile having said derivative of dihydrocollidine deposited thereon, thereby obtaining a brighter toned textile.

6. A method of improving the brightness of textile materials, comprising the steps of immersing a bleached textile material in an aqueous agent having distributed therethrough dihydrocollidine 3,5 dicarboxylic acid dibenzyl ester which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

7. A method of improving the brightness of textile materials, comprising the steps of immersing a bleached textile material in an aqueous agent having distributed therethrough 3,5 diphenylamido dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

8. A method of improving the brightness of textile materials, comprising the steps of immersing a bleached textile material in an aqueous agent having distributed therethrough 3,5 ditolylamido dihydrocollidine which fluoresces with a blue-white fluorescence under ultra violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a brighter toned textile.

9. A method of improving the brightness of textile materials, comprising the steps of immersing a bleached textile material in an aqueous agent having distributed therethrough 3,5 bis-p-methoxyphenylamido dihydrocollidine which fluoresces with a blue-white fluorescence under ultra-violet light until said textile material is impregnated with a sufficient amount of said derivative of dihydrocollidine to render said textile material whiter after rinsing and drying; and rinsing and drying said textile material being impregnated with said derivative of dihydrocollidine so as to obtain a substantially dry textile having said derivative of dihydrocollidine deposited thereon, thereby obtaining a bright toned textile.

10. A brightened textile, comprising a textile material being impregnated with a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine which fluoresces with a blue-white fluorescence under ultra-violet light in an amount sufficient to render said textile material whiter after rinsing and drying.

11. A brightened textile, comprising a bleached textile material being impregnated with a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy, methyl, monochloro and dichloro derivatives on the phenyl groups of 3,5 diphenylamido dihydrocollidine which fluoresces with a blue-white fluorescence under ultra-violet light in an amount sufficient to render said textile material whiter after rinsing and drying.

12. A brightened textile, comprising a dyed textile material being impregnated with a derivative of dihydrocollidine selected from the group consisting of 3,5 dicarboxylic acid esters of dihydrocollidine, 3,5 dicarboxylic acid esters of dihydrocollidine in which the gamma methyl group is substituted by another alkyl group, 3,5 dicarboxylic acid esters of dihydrocollidine in which the gamma methyl group is substituted by an aryl group, 3,5 diphenylamido dihydrocollidine and methoxy methyl, monochloro and dichloro derivatives on the phenyl groups of 3,5 diphenylamido dihydrocollidine which fluoresces with a blue-white fluorescence under ultra-violet light in an amount sufficient to render said textile material whiter after rinsing and drying.

HENRY B. APPLETON.
PETER F. KIEHL.

References Cited in the file of this patent

UNITED STATES PATENTS

| Number | Name | Date |
| --- | --- | --- |
| 2,108,503 | Murray | Feb. 15, 1938 |
| 2,334,348 | Miglarese | Nov. 16, 1943 |
| 2,341,009 | Axelrad | Feb. 8, 1944 |
| 2,468,431 | Eberhart | Apr. 26, 1949 |

FOREIGN PATENTS

| Number | Country | Date |
| --- | --- | --- |
| 522,672 | Great Britain | June 24, 1940 |